United States Patent
Kalhan et al.

(10) Patent No.: US 8,315,615 B2
(45) Date of Patent: Nov. 20, 2012

(54) WIRELESS COMMUNICATION DEVICE MANAGEMENT SYSTEM AND METHOD

(75) Inventors: Amit Kalhan, La Jolla, CA (US); Doug Dunn, Chula Vista, CA (US); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 777 days.

(21) Appl. No.: 11/135,863

(22) Filed: May 23, 2005

(65) Prior Publication Data

US 2006/0262743 A1    Nov. 23, 2006

(51) Int. Cl.
*H04M 3/00*    (2006.01)
(52) U.S. Cl. ..... 455/418; 455/419; 455/420; 455/435.1; 455/435.2
(58) Field of Classification Search .......... 455/418–420, 455/435.1–435.2, 436–439
See application file for complete search history.

(56) References Cited

U.S. PATENT DOCUMENTS

| | | | |
|---|---|---|---|
| 5,841,853 A | | 11/1998 | Yamanishi et al. |
| 5,974,312 A | * | 10/1999 | Hayes et al. ................. 455/419 |
| 5,995,829 A | | 11/1999 | Broderick |
| 6,157,828 A | | 12/2000 | Krishnamurthi |
| 6,188,899 B1 | | 2/2001 | Chatterjee et al. |
| 6,400,948 B1 | | 6/2002 | Hardin et al. |
| 6,564,055 B1 | | 5/2003 | Hronek |
| 6,625,198 B1 | | 9/2003 | Tiedemann, Jr. et al. |
| 6,738,617 B2 | | 5/2004 | Rosen et al. |
| 7,155,213 B1 | * | 12/2006 | Almeda et al. ................. 455/419 |
| 7,162,229 B2 | * | 1/2007 | Kazakevich ................. 455/418 |
| 2001/0005364 A1 | | 6/2001 | Kang |

(Continued)

FOREIGN PATENT DOCUMENTS

| | | |
|---|---|---|
| DE | 19930170 | 1/2001 |
| EP | 1347623 | 9/2003 |
| GB | 2378284 | 2/2003 |
| GB | 2410150 | 7/2005 |

OTHER PUBLICATIONS

3rd Generation Partnership Project 2 "3GPP2", "IP Based Over-the-Air Device Mangement (IOTA-DM) for cdma2000 Systems", 3GPP2 C.P0064-0, Ver. 0.5, pp. i to A-3, Dec. 10, 2004.

(Continued)

*Primary Examiner* — Patrick Edouard
*Assistant Examiner* — Julio Perez

(57) ABSTRACT

A device management enabled device performs device management for a non-device management enabled device. The device management enabled device performs the device management, connecting with the device management entity as a proxy for the non-device management enabled devices. After the device management enabled device has the information intended for the non-device management enabled device in the device management, then the device management enabled device connects to the non-device management enabled device and sends the device management information to the non-device management enabled device.

19 Claims, 3 Drawing Sheets

U.S. PATENT DOCUMENTS

| | | |
|---|---|---|
| 2002/0098828 A1* | 7/2002 | Wakil et al. .................. 455/408 |
| 2004/0098715 A1* | 5/2004 | Aghera et al. ................ 717/173 |
| 2004/0127205 A1 | 7/2004 | Mahajan |
| 2004/0261072 A1 | 12/2004 | Herle |
| 2004/0261073 A1* | 12/2004 | Herle et al. .................. 717/173 |
| 2005/0124367 A1* | 6/2005 | Hassan et al. ................ 455/518 |
| 2006/0063539 A1* | 3/2006 | Beyer ........................ 455/456.3 |
| 2006/0130053 A1* | 6/2006 | Buljore et al. ............... 717/173 |
| 2006/0168627 A1* | 7/2006 | Zeinstra et al. ................ 725/75 |
| 2006/0183486 A1* | 8/2006 | Mullen ..................... 455/456.1 |
| 2008/0004069 A1* | 1/2008 | Wesby et al. ................. 455/551 |

OTHER PUBLICATIONS

Langer, J. and Larsson, G., "Updates in the evolution of CDMA2000", CDMA2000—A world view, Ericsson Review No. 3, 2001, pp. 150-158.

Telecommunications Industry Association (TIA), TIA/EIA Telecommunications Systems Bulletin, Wireless Network Ref. Model, Rev. TSB100-A, pp. i-18, Mar. 2001.

International Search Report (ISR): PCT/ISA/220, 210 for International Application No. PCT/US2006/019811, ISR dated Oct. 30, 2006, 6 pages.

* cited by examiner

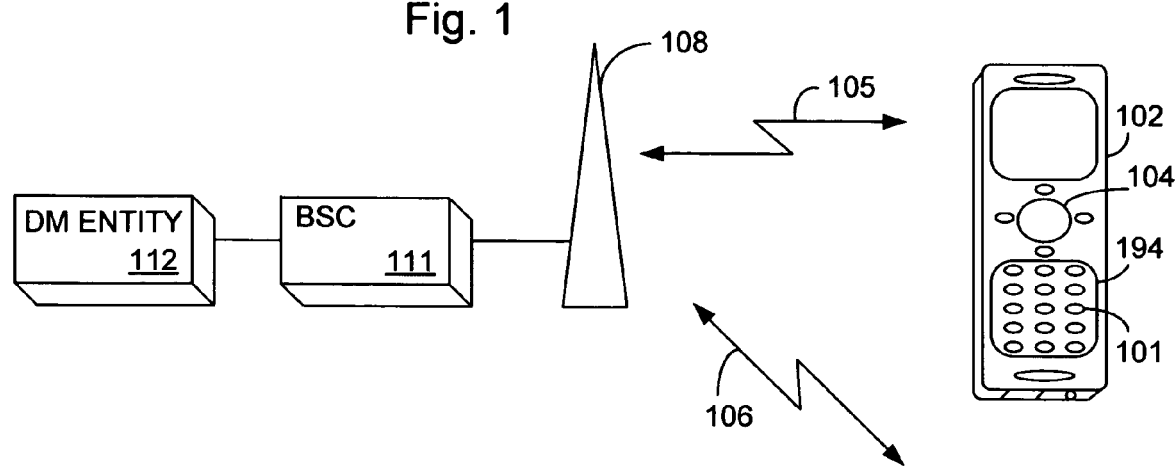
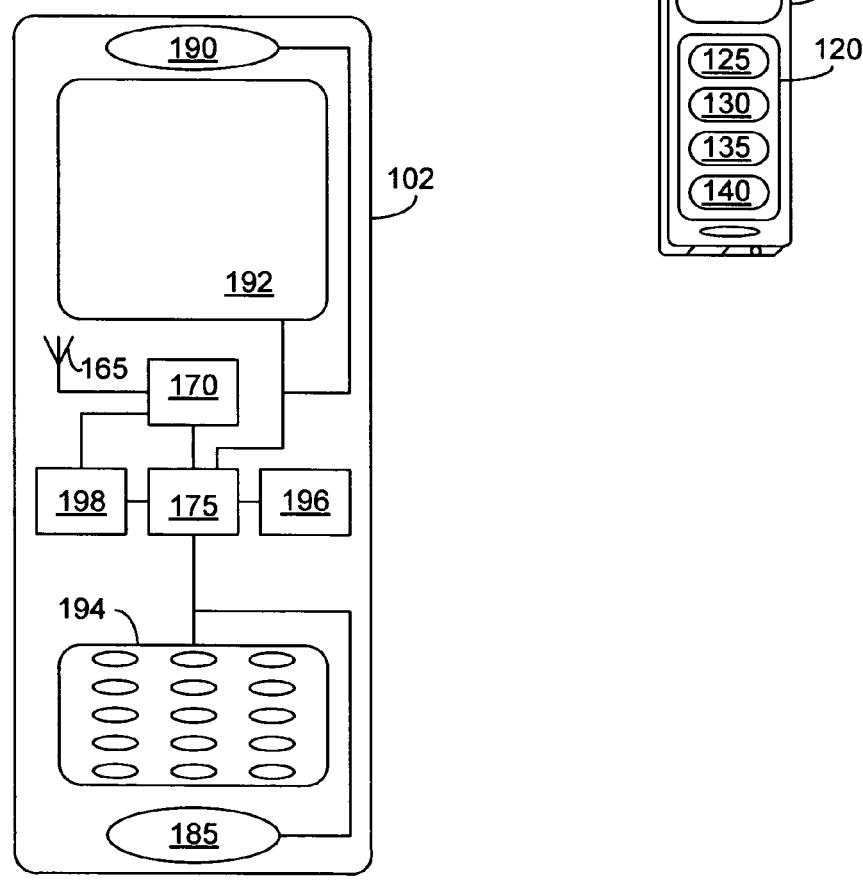

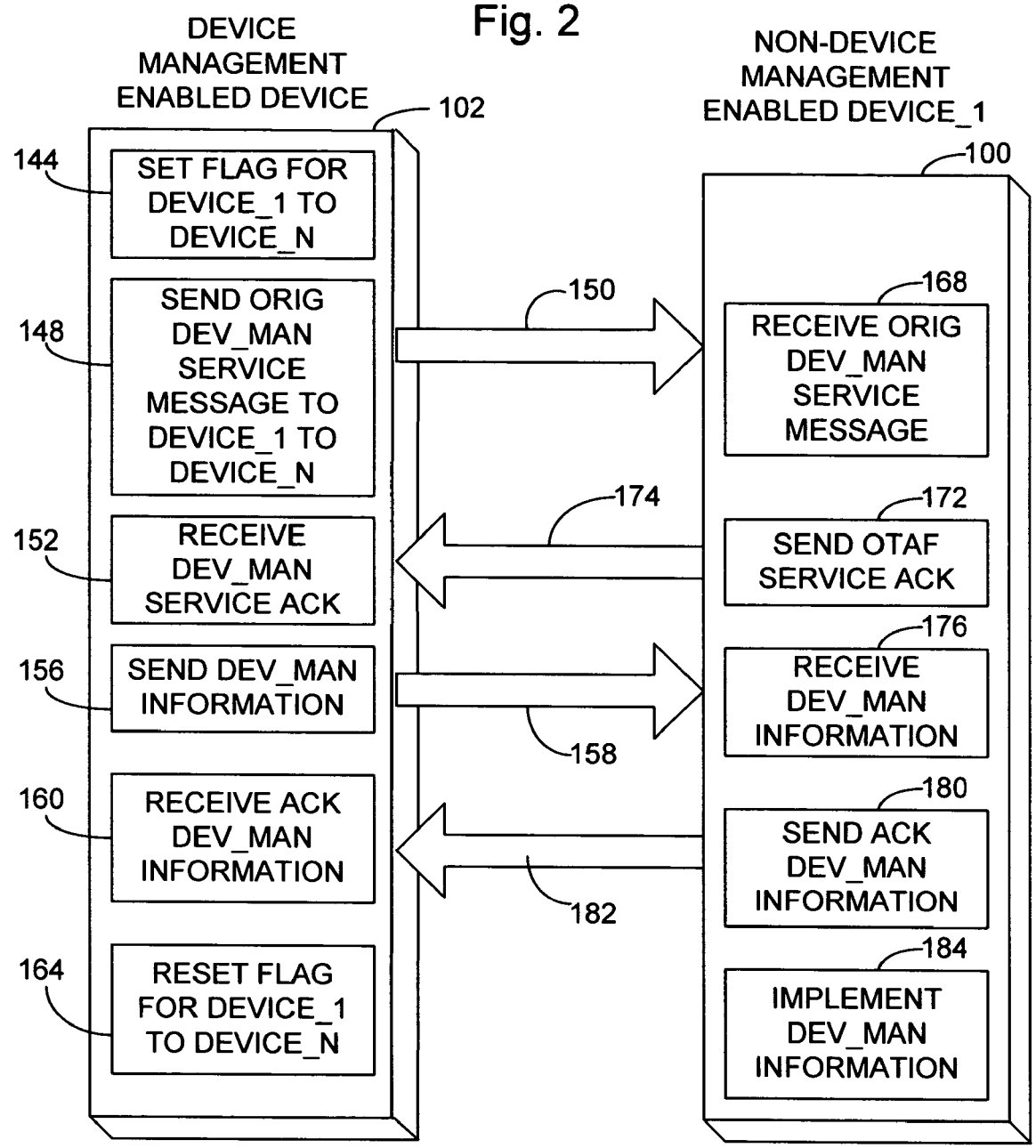

WIRELESS COMMUNICATION DEVICE MANAGEMENT SYSTEM AND METHOD

RELATED APPLICATIONS

This application relates to U.S. patent application Ser. No. 11/081,253, filed on Mar. 15, 2005, entitled "Wireless Communication Device and Method of Use"; and Ser. No. 11/080,227, filed on Mar. 21, 2005, entitled "Push-to-Locate Wireless Communication Device and Method of Use", which are hereby incorporated by reference.

BACKGROUND OF THE INVENTION

1. Field of the Invention

The invention relates generally to wireless communications and more particularly to device management for wireless communication devices.

2. Background

Consumers are increasingly demanding Push-to-Talk (PTT) functionality on wireless communication devices, such as, for example, cellular telephones. PTT service is a two-way form of communications that allows users to engage in immediate communication with one or more users. PTT service is similar to a "walkie-talkie" application where a user presses a button to talk with an individual user or broadcast to a group of participants. PTT users can program their cellular wireless communication devices for automatic answer such that voice reception is automatic and no recipient action is required. The communication is half-duplex, which means at most one person can talk at a time and all other participants hear the speech. This contrasts with voice calls, which are full duplex, where more than one person can talk at a time. Further, there is a demand for PTT only wireless communication devices.

Another area of rapid growth in wireless communication device services is Device Management. Device Management is the process of remotely managing device settings and applications. As the functionality of mobile devices expands, configuring and maintaining the services and features on the devices becomes a complex and time-consuming task. Even with limited features of today, many customers do not know how to configure their phones. Operators should ensure that phone configuration is quick and easy for the customer.

Device management and provisioning of new services can be performed over-the-air (OTA). IP-Based Over-the-Air Device Management (IOTA-DM) is possible. IOTA-DM will help the widespread adoption of mobile services, as it provides a mechanism for the users to easily subscribe to new services. For the operators this enables a fast and easy way to introduce new services and manage provisioned services, by dynamically adjusting to changes and ensuring a certain level of quality of service. Both Over-the-Air Service Provisioning (OTASP) and IP-Based Over-the-Air Handset Configuration Management (IOTA-HCM) can work in conjunction with Device Management.

Some cellular wireless communication devices may have a limited number of buttons or may only be capable of internet protocol connections. For example, they may not have a full 10-key keypad. They may have only dedicated buttons for calling specific, predetermined numbers. For example, some PTT only devices (POD's) may have only dedicated buttons for calling specific, predetermined numbers. Accordingly, they may not be able to perform Device Management over-the-air which requires the use of a keypad (e.g. dial *228 and press send for traditional OTASP session over a circuit-switched network).

SUMMARY OF THE INVENTION

A device management enabled device performs the device management for non-device management enabled device. The device management enabled device performs the device management, connecting with the device management entity as a proxy for the non-device management enabled device. After the device management enabled device has whatever information was intended for the non-device management enabled device, then the device management enabled device connects to the non-device management enabled device and sends the device management information to the non-device management enabled device.

The non-device management enabled device can get device management services despite limited keys or another limitation making it non-device management enabled. Also, device management services for a non-device management enabled device can be controlled by the device management enabled device.

Advantages may include being able to update one or more of the following on a non-device management enabled cellular wireless communication device: mobile identification number (MIN), preferred roaming list, address list or directory, electronic key exchange for security, CDMA operational parameters, number of entries in call history, and other parameters relating to call history.

Other aspects, advantages, and novel features of the invention will become apparent from the following Detailed Description, when considered in conjunction with the accompanying drawings.

BRIEF DESCRIPTION OF THE DRAWINGS

Embodiments of the present invention taught herein are illustrated by way of example, and not by way of limitation, in the figures of the accompanying drawings, in which:

FIG. 1 shows a block diagram illustrating a wireless communication system for updating a non-device management enabled cellular wireless communication device.

FIG. 2 shows a call diagram illustrating updating a non-device management enabled cellular wireless communication device.

FIG. 3 shows a block diagram illustrating a device management enabled wireless communication device.

DETAILED DESCRIPTION

Figure 4:
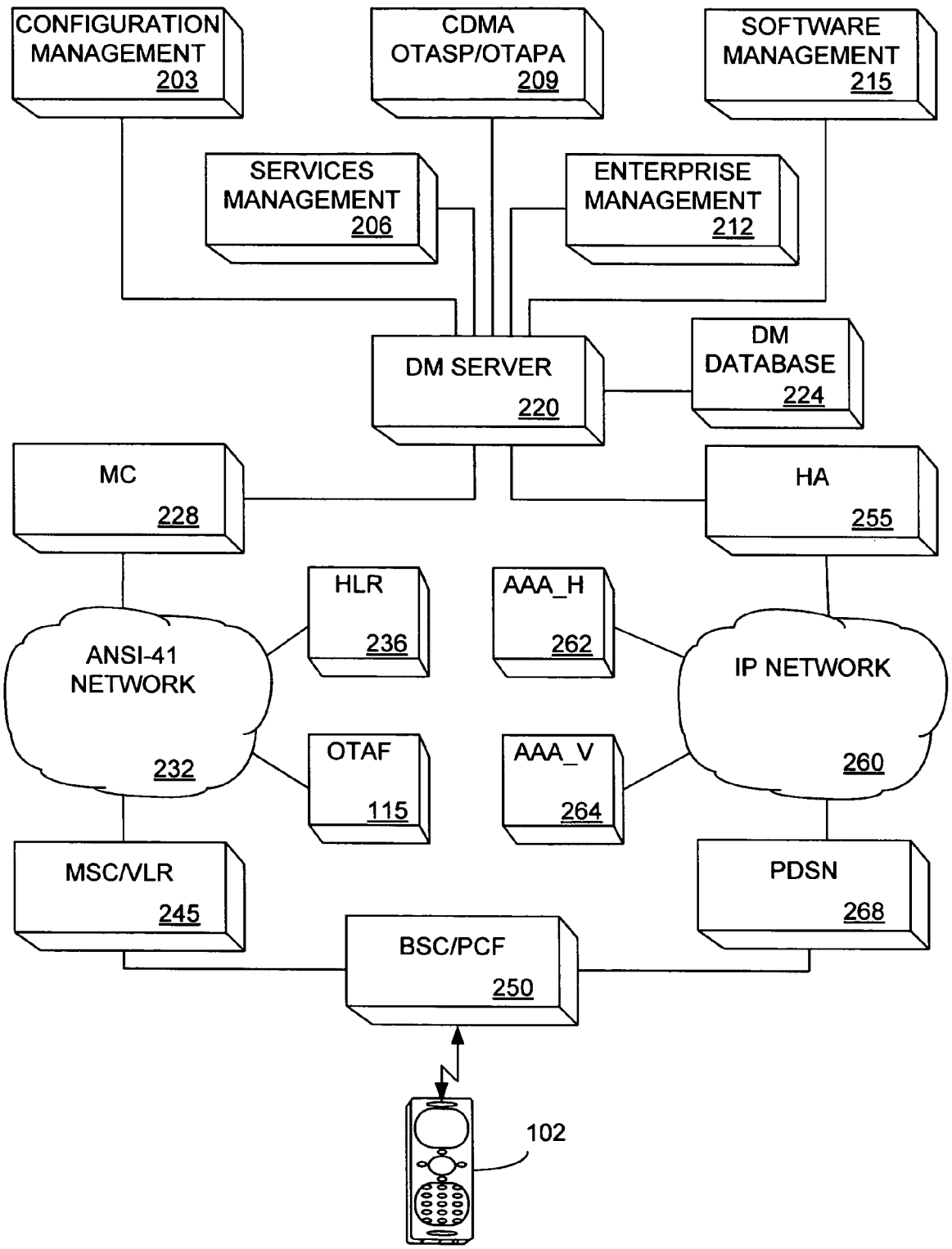
FIG. 4 shows a block diagram illustrating a wireless communication system for updating a non-device management enabled cellular wireless communication device.

FIG. 1 shows a block diagram illustrating a wireless communication system for updating non-device management enabled cellular wireless communication device 100. Various aspects related to device management and wireless communication device services are described in U.S. Pat. No. 6,738,617 B2, issued May 18, 2004, to Rosen, et al.; U.S. Pat. No. 6,564,055 B1, issued May 13, 2003, to Hronek; U.S. Pat. No. 6,400,948 B1, issued Jun. 4, 2002, to Hardin; and U.S. Pat. No. 6,188,899 B1, issued Feb. 13, 2001, to Chatterjee, et al.; and U.S. Pat. Pub. Nos. 2001/0005364 A1, pub. Jun. 28, 2001, by Kang; and 2004/0127205 A1, pub. Jul. 1, 2004, by Mahajan, which are incorporated in whole herein by reference.

Device management enabled cellular wireless communication device 102 communicates over the air interface 105 with base station 108. Non-device management enabled cellular wireless communication device 100 and device management enabled cellular wireless communication device 102 may be referred to as mobile stations. Base station 108 communicates with base station controller (BSC) 111. BSC 111 communicates with device management entity (DME) 112. DME 112 performs service provisioning and updating functions for mobile station 102. For example, DME 112 may be configured to update one or more of the following items for device management enabled cellular wireless communication device 102: mobile identification number (MIN), preferred roaming list, address list or directory, electronic key exchange for security, CDMA operational parameters, number of entries in call history, and other parameters relating to call history. The updated item can be referred to as an update. DME 112 may be an Over the Air Service Provisioning Function (OTAF) or a device management (DM) server, as will be described more fully below with respect to FIG. 4.

To complete the update, the user of wireless communication device 102 may be prompted to make various device management-related selections. For example, the user may be prompted to select "9" to complete the device management update. The user then pushes the key 101 marked "9" (not shown) on the keypad 194. The wireless communication device may also include a navigation key for navigating through various menus and/or selections.

After the update has been received by device management enabled device 102, the update can be delivered to non-device management enabled device 100. Advantageously, this allows non-device management enabled device to receive device management updates despite not being device management enabled. For example, non-device management enabled device 100 may have a limited keypad 120. For example, non-device management enabled device 100 may have only four keys 125, 130, 135 and 140, as shown with respect to FIG. 1. Non-device management enabled device 100 may have more or less than four keys, or the keys may be configured differently than shown with respect to FIG. 1.

Keys 125, 130, 135 and 140 may be dedicated push to talk (PTT) keys. Device 100 may be a PTT only cellular telephone. Keys 125, 130, 135 and 140 may be dedicated to particular individuals. For example, key 125 may cause a PTT call to the user's mother. Key 130 may cause a PTT call to the user's father. Key 135 may cause a PTT call to one of user's friends. Finally, key 135 may cause a PTU call to an emergency service. Such a cellular telephone may be much easier and quicker to use than conventional cellular telephones, which have full keypads, such as device 102.

Some aspects of PTT communications are described in U.S. patent application Ser. No. 10/931,712, filed on Sep. 1, 2004, by Kirbas; and Ser. No. 10/903,174, filed on Jul. 30, 2004, by Chhatriwala, et al.; Ser. No. 10/969,386, filed on Oct. 19, 2004 by Serbin, et al., which are each assigned to the assignee of the present invention, and which are hereby incorporated by reference. Advantageously, device 100 can be updated with device management information even though device 100 is a non-device management enabled device.

FIG. 4 shows a block diagram illustrating another wireless communication system for updating a non-device management enabled cellular wireless communication device. It is envisioned that such, or a similar, wireless communication system will be implemented soon. See "IP Based Over-the-Air Device Management (IOTA-DM) for cdma2000® Systems", 3rd Generation Partnership Project 2 "3GPP2", C.P0064-0 Ver. 0.6, Jan. 10, 2005. CDMA2000® is a registered trademark of the Telecommunications Industry Association (TIA-USA). When applied to goods and services, the CDMA2000® mark certifies their compliance with CDMA2000® standards.

A list of terms and definitions used with respect to FIG. 4 is shown in Table 1, below.

Table 1

Authentication, Authorization and Accounting (AAA). In IP-based networking, a method used to control what resources users have access to and to keep track of the activity of users over a network.

Base Station Controller (BSC). A network entity that routes voice- and circuit-switched data messages between the cell sites and the MSC. It also bears responsibility of controlling and directing handoffs from one cell site to another as needed.

CDMA OTASP/OTAPA. See Over-The-Air Parameter Administration (OTAPA) and Over-The-Air Service Provisioning (OTASP), below.

Configuration Management, Enterprise Management, Services Management and Software Management. Wireless communication carrier defined systems and services. Network entities that issue synchronization markup language (SyncML) DM commands to devices and correctly interpret responses sent from the devices. SyncML is a platform-independent information synchronization standard that can replace existing synchronization solutions that are vendor, application or operating system specific. For each type of management, an associated management software client in the mobile device would correctly interpret SyncML commands, execute appropriate actions in the mobile device and send relevant responses to the issuing management entity. Further information relating to management entities can be found in "SyncML Device Management Tree and Description", Open Mobile Alliance (OMA), OMA-SyncMI-DMTND-V1_1_2-20030612-C.

Device Management (DM). A method for remotely managing devices. Management includes initial provisioning, management of provisioned parameters, and programming of new parameters.

DM Server. Entity in the network managing the services and applications in a mobile device. It issues DM commands and correctly interprets responses from the DM client.

Home Agent (HA). A network entity that maintains an association between the mobile's home IP address and its "care of" address (that is, its loaned address) from a foreign network (i.e. a foreign agent such as a PDSN). The HA redirects and tunnels packets to the care of address on the foreign network.

Home Location Register (HLR). The HLR is the main database of permanent subscriber information for a mobile network in a circuit switched network, such as, for example, an ANSI-41 network. The HLR is an integral component of at least code division multiple access (CDMA), time division multiple access (TDMA) and Global System for Mobile communications (GSM) networks. HLR is maintained by the subscriber's home carrier and contains pertinent user information, including address, account status and preferences. The HLR interacts with the mobile switching center (MSC), which is a switch used for call control and processing.

Message Center (MC). A network entity that handles SMS messages to and from the mobile station. The Message Center may be separate from or physically integrated into the wireless system.

Mobile Switching Center (MSC). A configuration of equipment that provides wireless radio telephone service. Also called the mobile telephone switching office (MTSO). The MSC also serves as a point-of-access to the public switched telephone network (PSTN).

Over-the-Air Service Provisioning Function (OTAF). A configuration of network equipment that controls OTASP functionality and messaging protocol.

Over-The-Air Parameter Administration (OTAPA). Network initiated OTASP process of provisioning mobile station operational parameters over the air interface. See "Over-the-Air Service Provisioning of Mobile Stations in Spread Spectrum Systems", $3^{rd}$ Generation Partnership Project 2 "3GPP2", C.S0016-C Ver. 1.0, Oct. 22, 2004.

Over-The-Air Service Provisioning (OTASP). A process of provisioning mobile station operational parameters over the air interface. See "Over-the-Air Service Provisioning of Mobile Stations in Spread Spectrum Systems", $3^{rd}$ Generation Partnership Project 2 "3GPP2", C.S0016-C Ver. 1.0, Oct. 22, 2004.

Packet Control Function (PCF) is a network entity that routes IP packet data between the mobile station within the cell sites and the Packet Data Serving Node (PDSN). During packet data sessions, it will assign available supplemental channels as needed to comply with the services requested by the mobile and paid for by the subscribers. The PCF maintains a "reachable" state between the Radio Network and the mobile station, ensuring a consistent link for packets; buffers packets arriving from the PDSN when radio resources are not in place or insufficient to support the flow from the PDSN; and relays packets between the MS and the PDSN.

Visitor Location Register (VLR). VLR is a database that maintains temporary user information (such as current location) to manage requests from subscribers who are out of the area covered by their home system. When a user initiates a call, the switching equipment determines whether or not the call is coming from the device's home area. If the user is out of the home area, the area VLR sends out a request for information required to process the call. An MSC queries the HLR identified by the call for information, which it relays to the appropriate MSC. The appropriate MSC relays the information to the VLR.

Device 102 is connected by an air interface to base station controller (BSC) and packet call function (PCF), which are together referred to as BSC/PCF 250. BSC is connected to mobile switching center (MSC), which is shown in one block with visitor location register (VLR), which are together referred to as MSC/VLR 245. MSC/VLR 245 is connected to an ANSI-41 network 232. OTAF 115 is connected to ANSI-41 network 232. OTAF 115 may become obsolete as DM server 220 (described later), can perform all of the functions of OTAF 115. However, OTAF 115 is included in FIG. 4 and envisioned to continue to exist for some time for backward compatibility.

ANSI-41 network 232 is also connected to home location register (HLR) 236. MSC queries HLR 236 to authenticate the MS and determine the status of the MS. ANSI-41 network 232 is connected to message center (MC) 228. MC 228 is a network entity that handles SMS messages to and from the Mobile station. The MC may be separate from or physically integrated into the wireless system.

MC 228 is connected to device management (DM) server 220. DM server 220 is a network entity that manages the services and applications in a mobile device. It issues DM commands and correctly interprets responses from the DM client, for example, mobile station 102. DM server 220 is connected to a DM database 224 and five management entities, namely, configuration management 203, services management 206, CDMA OTASP/OTAPA 209, enterprise management 212 and software management 215. CDMA OTASP/OTAPA 209 manages OTASP and OTAPA for DM enabled device 102.

Mobile station 102 can also be connected to internet protocol (IP) network 260 through PCF (shown with BSC as BSC/PCF 250) and packet data switched network (PDSN) 268. IP network 260 is connected to home authentication, authorization and accounting (AAA) entity 262 and visitor (AAA) entity 264.

IP network is also connected to home agent (HA) 255. HA 255 is a network entity that maintains an association between the mobile's home IP address and its "in care of" address, that is, its loaned address, from a foreign network (i.e., a foreign agent such as a PDSN). HA 255 redirects and tunnels packets to the "care of" address on the foreign network.

HA is connected to DM server 220 for performing the functions described above with respect to DM server 220. Thus, DM server 220 is connected to both ANSI-41 network (through MC 228) and to IP network 260 (through HA 255). Accordingly, CDMA OTASP and CDMA OTAPA functions can be performed through both packet data (through IP network 260) and through circuit switched connections (through ANSI-41 network 232).

Device 100 can be updated as described with reference to FIG. 2 FIG. 2 shows a call diagram illustrating updating non-device management enabled cellular wireless communication device 100, using device management enabled cellular wireless communication device 102. After device management enabled device 102 has obtained an update, device management enabled device 102 sets a flag or flags, in step 144, to update non-device management enabled device 100 (and possibly others, not shown). The process shown with respect to FIG. 2 may be repeated with respect to other non-device management enabled devices (not shown). That is, device 102 may similarly update a number of non-device management enabled devices (not shown), which are designated in steps 144 and 164 as devices other than device 100 in DEVICE_1 to DEVICE_N. Device 100 is designated as DEVICE_1.

Device management enabled device 102 sends an origination device management service message to DEVICE_1 to DEVICE_N, as shown in step 148. Arrow 150 represents the origination device management service message travelling over the air from device management enabled device 102 to non-device management enabled device 100. As shown with respect to FIG. 1, the over the air message 150 travels over the air to base station 108 via wireless connection 105 and then from base station 108 to non-device management enabled device 100 via wireless connection 106.

The message 150 is routed through the wireless network including mobile switching center 111. Alternatively, the message 150 may be routed through an IP-based wireless network, as is the case in a typical PTT call. Alternatively, the message 150 can be sent to the non-device management enabled device 100 via a wireless connection such as Bluetooth, for example, or a wired connection. The message 150 may be routed to another base station (not shown) if non-device management enabled device 100 is not in contact with the same base station 108 as device management enabled device 102. As shown with respect to FIG. 2, however, non-device management enabled device 100 is in contact with the same base station 108 as device management enabled device 102.

Origination device management service message 150 is received at non-device management enabled device 100 in step 168. Advantageously, non-device management enabled device 100 responds to origination device management service message without requiring any user invention. For example, non-device management enabled device 100 may recognize the MIN of device management enabled device 102. Non-device management enabled device 100 may be preprogrammed to accept an originate device management service message from device management enabled device 102, based on the MIN of device management enabled device 102.

Responsive to receiving origination device management service message 150, non-device management enabled device 100 sends device management service acknowledgement message, in step 172. Device management service acknowledgement message 174 is sent over the air from non-device management enabled device 100 to device management enabled device 102.

Device management enabled device 102 receives device management service acknowledgement message 174, in step 152. Responsive to receiving device management service acknowledgement message 174, device management enabled device 102 sends device management service information 158, in step 156.

Non-device management enabled device 100 receives device management service information 158, in step 176. Responsive to receiving device management service information 158, non-device management enabled device 100 sends acknowledge device management service information message 182, in step 180, to device management enabled device 102. Advantageously, in step 184 non-device management enabled device 100 implements device management information in non-device management enabled device 100. For example, non-device management enabled device 100 may update its MIN, preferred roaming list, address list or directory, electronic key exchange for security, CDMA operational parameters, number of entries in call history, and other parameters relating to call history.

A device management enabled device can be used to control the device management services of one or more non-device management enabled devices. Thus, device management service for a device could be intentionally disabled, even if the device is not otherwise limited from device management services. For example, a parent might not want young children to be able to control their own device management services. The parent could purchase non-device management enabled devices for the young children. Then the device management service items could only be updated by the parent. As another example, an employer may not want employees to have control of device management services. The employer could purchase non-device management enabled devices for the employees. Then the device management service items could only be updated by the employer (or, for example, a supervisor).

After receiving device management information service acknowledgement message 182 from non-device management enabled device 100 in step 160, device management enabled device 102 resets the flag for device 100 in step 164. As described above, device management enabled device 102 may repeat this process for more non-device management enabled devices, using the flags to keep track of which non-device management enabled devices have been successfully updated. Further, device management enabled device 102 may perform the methods described with respect to FIG. 2 concurrently for the possible multiple non-device management enabled devices DEVICE_1 to DEVICE_N.

Cellular telephone 102 will now be described with respect to FIG. 3. FIG. 3 shows a block diagram of cellular telephone 102. Cellular telephone 102 includes antenna 165 for communicating radio frequency RF signals over the air. Antenna 165 is shown internal to cellular telephone 102. In fact, antenna 165 may be internal or external. Additionally, there may be more than one antenna.

Antenna 165 is connected to modem 170 for converting the RF signal to a digital signal and for converting a digital signal to an RF signal. Modem 170 may include, for example, any one or more of the following RF components, a duplexer, a filter, a mixer and an RF amplifier, in addition to a base band processor. Modem 170 may process cellular communication signals, such as, for example, U.S. PCS signals or GSM signals. Other communication signals are possible, such as, for example, U.S. cellular communication between 824 and 899 MHz.

Modem 170 is connected to processor block 175. Processor block 175 performs many functions for the cellular telephone. Processor block 175 may, for example, decode the digital signal to present an audio signal at a user interface device 190 such as a speaker 190. Other common user interface devices that are connected to processor are microphone 185, display screen 192, keypad 194. Other user interface devices are possible.

Processor block 175 may include one or more processors. Additionally, one or more of the functions and processes described herein may be performed by discreet logic or any other convenient device such as, for example, a field programmable gate array (FPGA), separately or in conjunction with a processor. Further, processor block 175 may perform some of the functions of modem 170. For example, base band processing may be performed by processor block 175. Still further, one or more of the functions and processes described herein may be performed in part by software and in part by hardware.

Processor block 175 is connected to memory block 196. Memory block 196 may include one or more memory components. The memory components may be any convenient type of memory, such as, for example, flash memory, random access memory, read only memory, volatile memory, non-volatile memory and removable memory. Further, while memory block 196 and processor block 175 are shown as separate entities, processor block may have some internal memory and therefore may contain memory block 196. Memory block 196 stores the code and data necessary for the cellular telephone to perform the functions described herein and those functions that are known in the art.

Processor block 175 is also connected to portable power supply 198, such as, for example, a battery. Portable power supply 198 provides power for processor block 175. Portable power supply 198 is also connected to modem 170, for supplying power to modem 170. Portable power supply 198 may be connected to other components, such as, for example, display 192.

Further, while embodiments and implementations of the invention have been shown and described, it should be apparent that many more embodiments and implementations are within the scope of the invention. Accordingly, the invention is not to be restricted, except in light of the claims and their equivalents.

What is claimed is:

1. A device management enabled cellular communication device configured to send, to a non-device management enabled cellular communication device, device management service information received at the device management enabled cellular communication device from a device management server, wherein the device management enabled cellular communication device is configured to send an origination device management service message to the non-device management enabled cellular communication device, to receive a device management service acknowledgment message from the non-device management enabled cellular communication device, and to send the device management service information in response to receiving the device management service acknowledgement message;

wherein the device management service information updates a cellular communication operational parameter of cellular communication with the non-device management enabled cellular communication device when applied at the non-device management enabled cellular communication device.

2. The device management enabled cellular communication device of claim 1, wherein the cellular communication operational parameter is selected from the group comprising: a mobile identification number, a preferred roaming list, an address list, an address directory, an electronic security key, a CDMA operational parameter, and all combinations thereof.

3. The device management enabled cellular communication device of claim 1, wherein the device management enabled cellular communication device is further configured to send the device management service information through a wireless connection.

4. The device management enabled cellular communication device of claim 3, wherein the wireless connection comprises a first wireless connection between the device management enabled cellular communication device and a base station and a second wireless connection between the base station and the non-device management enabled cellular communication device.

5. The device management enabled cellular communication device of claim 3, wherein the wireless connection comprises a Bluetooth wireless connection between the device management enabled cellular communication device and the non-device management enabled cellular communication device.

6. The device management enabled cellular communication device of claim 1, wherein the device management enabled cellular communication device is further configured to receive the device management service information from the device management server over a wireless link.

7. The device management enabled cellular communication device of claim 1, wherein the device management enabled cellular communication device is further configured to receive the device management service information from the device management server over an internet protocol (IP) connection.

8. The device management enabled cellular communication device of claim 1, wherein the cellular communication operational parameter comprises software code.

9. The device management enabled cellular communication device of claim 1, wherein the cellular communication operational parameter comprises device configuration information.

10. The device management enabled cellular communication device of claim 1, wherein the cellular communication operational parameter comprises a service update parameter.

11. A method comprising:
receiving, at a device management enabled cellular communication device, device management service information from a device management server; and
wirelessly sending, to a non-device management enabled cellular communication device incapable of receiving the device management service information from the device management server, an origination device management service message;
wirelessly receiving a device management service acknowledgment message from the non-device management enabled cellular communication device;
in response to the device management service acknowledgment message, wirelessly sending the device management service information to update a cellular communication operational parameter of cellular communication with the non-device management enabled cellular communication device when the device management service information is applied at the non-device management enabled cellular communication device.

12. The method of claim 11, wherein the cellular communication operational parameter is selected from the group comprising: a mobile identification number, a preferred roaming list, an address list, an address directory, an electronic security key, a CDMA operational parameter, and all combinations thereof.

13. The method of claim 11, wherein the cellular communication operational parameter comprises software code.

14. The method of claim 11, wherein the wirelessly sending comprises sending the device management service information through a wireless connection between a base station and the non-device management enabled cellular communication device.

15. The method of claim 11, wherein the receiving comprises receiving the device management service information from the device management server over a cellular communication link.

16. The method of claim 11, wherein the receiving comprises receiving the device management service information from the device management server over an internet protocol (IP) connection.

17. A cellular communication device comprising:
a modem configured to receive device management service information from a device management server over a cellular communication link, to wirelessly send, to a non-device management enabled cellular communication device incapable of receiving the device management service information from the device management server, an origination device management service message, and in response to a device management service acknowledgement message received from the non-device management enabled cellular communication device, to wirelessly send the device management service information to update a cellular communication operational parameter of the non-device management enabled cellular communication device when the device management service information is applied at the non-device management enabled cellular communication device.

18. The cellular communication device of claim 17, wherein the cellular communication operational parameter is selected from the group comprising: a mobile identification number, a preferred roaming list, an address list, an address directory, an electronic security key, a CDMA operational parameter, and combinations thereof.

19. The cellular communication device of claim 17, wherein the cellular communication operational parameter comprises software code.

* * * * *